March 13, 1945.  H. M. BADGER ET AL  2,371,578
NESTED FOOD CARRYING EQUIPMENT
Filed May 1, 1943    2 Sheets-Sheet 1

Inventor
Harry M. Badger
Oscar M. Anderson
By Lindsey and Robillard
Attorneys

March 13, 1945.   H. M. BADGER ET AL   2,371,578
NESTED FOOD CARRYING EQUIPMENT
Filed May 1, 1943   2 Sheets-Sheet 2

Inventor
Harry M. Badger
Oscar M. Anderson
By Lindsey and Robillard
Attorneys

Patented Mar. 13, 1945

2,371,578

UNITED STATES PATENT OFFICE 2,371,578

NESTED FOOD CARRYING EQUIPMENT

Harry M. Badger and Oscar M. Anderson, New Britain, Conn., assignors to Landers, Frary & Clark, New Britain, Conn., a corporation of Connecticut Application May 1, 1943, Serial No. 485,382

2 Claims. (Cl. 220—97)

This invention relates to food containers and has particular reference to an improved arrangement whereby any number of the containers may be simply secured together in superimposed relation for carrying purposes. The invention is particularly adapted for use in connection with insulated jugs or jars each having an outer wall and an inner wall or vessel, the space between the walls being insulated by a suitable insulating material or by providing a partial vacuum therebetween.

An aim of the invention is to provide a simplified and economical arrangement by means of which the several jars may be very quickly and automatically locked together by simply nesting one on top of another and, when so locked, the assembly of jars may be carried from place to place by the handle provided on the topmost one without danger of the jars becoming disconnected. When it is desired to disconnect the jars or containers one from the other, this can be very quickly and easily done.

A further aim of the invention is to provide a container with an improved handle arrangement which will permit the handle to be readily swung into and out of operative position and, when in operative position, will resiliently hold the cover of the container against displacement.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings, wherein we have shown, for illustrative purposes, one embodiment which the present invention may take:

Figure 1:
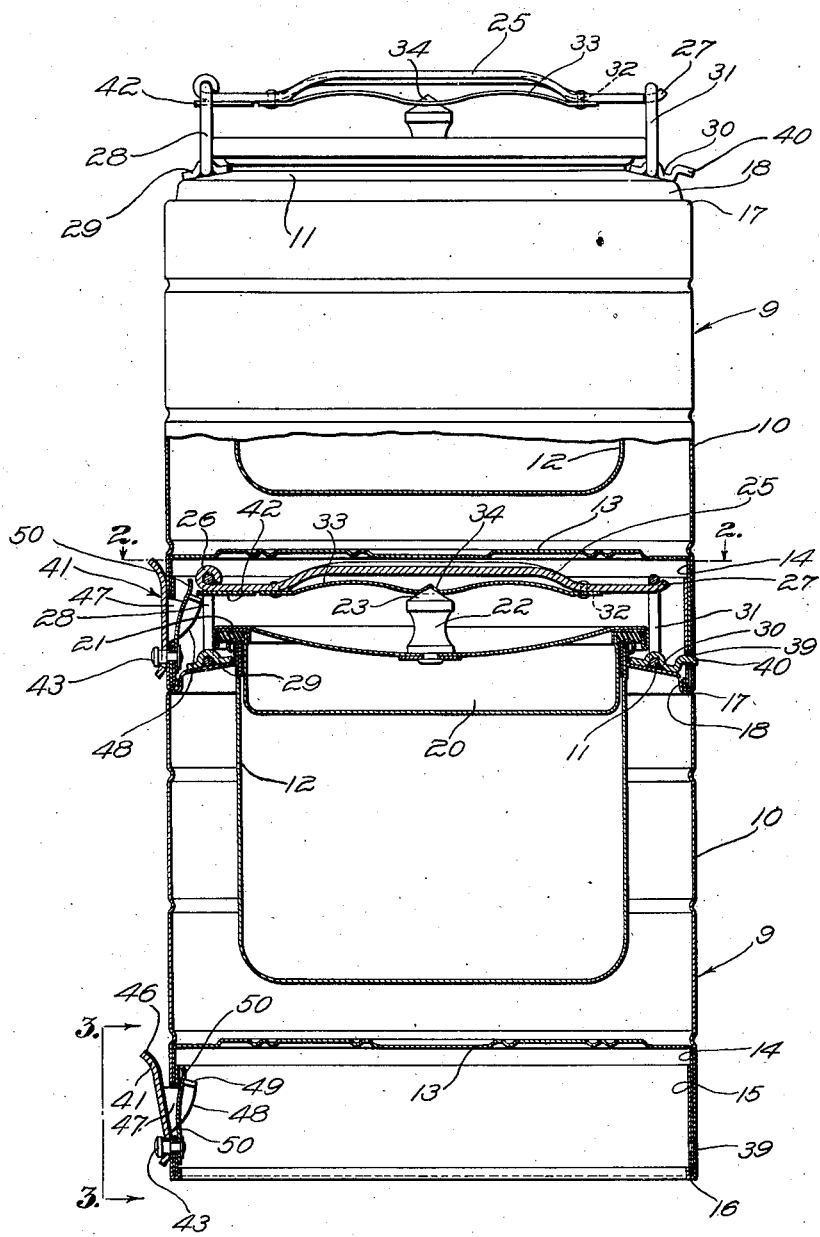
Figure 1 is a side elevational view, with parts broken away, of an assembly of two containers or insulated jars provided with our improvements.
Figure 2:
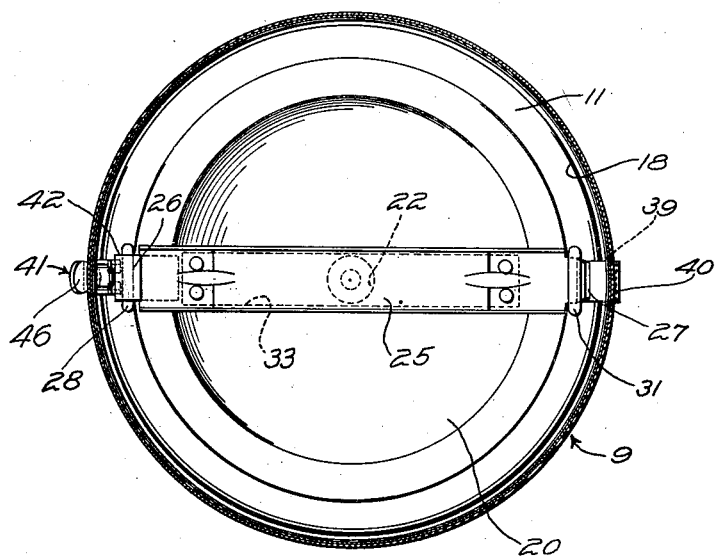
Fig. 2 is a sectional view taken on line 2—2 of Fig. 1 and shows the lower jar in plan elevation and the bottom skirt of the upper jar in horizontal section.
Figure 3:
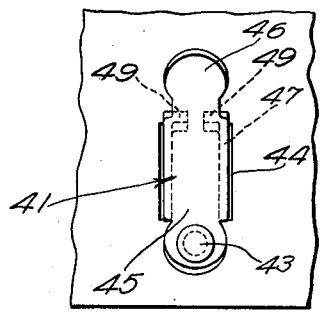
Fig. 3 is a detail view of the locking lever looking in the direction of the arrows 3—3 of Fig. 1.

Referring to the drawings in detail, each of the jugs is here shown, for illustrative purposes, as having a casing 9 provided with a side wall 10 which is here shown as being cylindrical. The upper edge of the side wall 10 is turned inwardly to provide an annular top wall 11 from which is suspended an inner wall or vessel 12 adapted to receive food or other material. The bottom of the casing is closed by a cap-shaped closure member having a top wall 13 and a depending flange 14 of such shape and size as to closely telescope into the lower end of the cylindrical wall 10. Welded or otherwise secured to the inside of the flange 14 is a reinforcing band 15. The bottom closure member may be secured in place by turning the bottom edge of the wall 10, as at 16, about the bottom edges of the flange 14 and the band 15. The space between the side and bottom walls of the casing 9 and the vessel 12 may contain a suitable insulating material, not shown, or the air may be drawn out of this space so as to provide a partial vacuum. It will be seen that each jug, at the bottom thereof, has a compartment open at its bottom so that when one jug is nested upon a lower one, the bottom compartment of the upper jug will accommodate the upper end and the handle of the lower jug. The lower end of the side wall 10, the flange 14 of the closure member, and the band 15 constitute a depending skirt which forms the cylindrical wall of this compartment. At the juncture of the cylindrical wall 10 and the top wall 11 of the casing is a slight step or inset so as to provide a shoulder or seat 17 on which the lower edge of a superimposed jug may rest and also so as to provide a slightly reduced cylindrical or peripheral portion 18 adapted to fit in the lower end depending skirt of the superimposed jar so that the two jars will be held against lateral movement when properly assembled. The numeral 20 designates generally a cover for the receptacle, the same having a gasket 21 adapted to rest upon the beaded or curled top edge of the vessel 12. The cover has a knob 22, the upper end 23 of which is preferably in the form of a cone.

In accordance with the present invention, each of the jugs is provided with a handle 25 which, when in operative position, extends diametrically across the cover 20, and this handle is provided with spring means for holding the cover securely in place. As here shown, the handle 25 comprises a strip of metal bowed upwardly at its central portion and having at one end a knuckle 26. The other end of the handle is turned up slightly so as to form a hook 27. The knuckle 26 receives the upper bar of a rectangular link 28 and the lower bar of which is pivoted in a clip 29 welded or otherwise secured to the top wall 11 of the casing 9 to one side of the vessel 12. Secured to this upper wall 11 to the other side of the vessel 12 is a clip 30 in which is pivoted a link 31 adapted to cooperate with the hooked end of the handle for securing the latter in place. Secured to the under side of the handle, as by means of rivets 32, and bridging the bowed portion of the handle is a leaf spring 33 having at its intermediate portion a conical recess 34 adapted to receive the upper end of the conical portion 23 of the knob 22 when the handle is in place. It will be seen from the drawings that when the handle is in operative position, the hooked end 27 of the handle is engaged beneath the upper cross bar of the link 31 and the leaf spring 33 serves to maintain the cover 20 in place and also to resiliently hold the hooked end of the handle upwardly against the upper cross bar of the link 31 so that accidential displacement will not take place. When it is desired to move the handle into an out of the way position, it is merely necessary to depress the handle sufficiently to permit the link 31 to be thrown outwardly and then pivot the handle about its attached end.

In order that the containers or jars may be secured together in superimposed or stacked relation, the depending annular flange or skirt of each container is provided at one side with a slot or opening 39 for the reception of a laterally extending lug 40 on the top of the next lower container, and pivotally connected to the skirt or flange at the other side is a locking lever 41 adapted to cooperate with a locking plate or keeper 42 secured to the under side of the handle 25 at the pivoted end thereof. In the present illustrative disclosure, the lug 40 is formed integrally with the clip 30.

The locking lever is loosely pivoted on a stud or rivet 43 carried by the depending flange or skirt of the container immediately beneath a rectangular opening 44 therein. The locking lever is referably formed of sheet metal by suitable stamping and bending operations. It has a body portion 45 located externally of the skirt and vertically bridging the opening 44 therein. The lower end of this body portion is loosely pivoted on the stud 43, and the upper end of the body portion has a pull or finger piece 46. Extending inwardly from the side edges of the body portion is a pair of wings 47, the inner edges 48 of which are curved upwardly and inwardly so as to form cams. At the inner upper corners of the wings are ears or lugs 49 which are turned towards one another so that their upper surfaces form a latching abutment which is adapted to engage under the protruding end of the keeper or locking plate 42. This plate is welded or otherwise secured to the pivoted end of the handle and is adapted to extend through the link 28 when the handle is in operative position. For the purpose of normally urging the locking lever to latching position, a leaf spring 50 is provided. This spring, at its lower end, is anchored to the rivet 43. It extends upwardly between the wings 47 and adjacent its upper end engages the outwardly facing edges of the lugs or ears 49.

With this arrangement, it will be seen that the containers may be very quickly and easily locked or secured together in superimposed relation, it being merely necessary to lower one of the containers over the top of the other one; engage the lug 40 in the slot 39 while the upper container is slightly inclined with respect to the lower one, and then swing the upper container to a vertical position. When the upper container is so swung, the cam edges 48 will engage the knuckle 26 of the handle and the outer edge of the locking plate 42 so that the locking lever will be cammed outwardly and then when the upper container is brought to final position, the spring 50 will automatically move the locking lever to a position where the ears 49 are beneath the protruding end of the locking plate 42. The superimposed or nested containers can now be carried from place to place by means of the handle on the uppermost container. Any number of jugs may be connected in superimposed relation and the several jugs may contain food of different sorts; for example, one may contain soup, another a stew, and a third coffee, etc. When it is desired to remove one jug from the other, it is merely necessary to pull out the locking lever by means of the pull 46 and then lift the upper jug from the lower one.

It will be seen that our improved arrangement is a very simple and effective one and that the parts may be manufactured and assembled at a relatively low cost. The operations of connecting the jugs together and disconnecting them one from the other may be very readily and quickly carried out.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. A plurality of food containers nested one upon the other, each container having on its top a handle and the outer wall of each container adjacent its top having a slight inset to provide a seat and a slightly reduced peripheral portion extending upwardly from the seat, each container having at its bottom a depending skirt adapted to rest upon the seat and to receive the reduced peripheral portion and the handle of the next lower container, each of said containers having at its top a lug extending laterally towards one side thereof and each of the skirts having a slot adapted to receive the lug of the next lower container, a keeper carried by each handle and extending towards the other side of said container, and a latch carried by each skirt on the side opposite the slot therein and adapted to cooperate with the keeper on the handle of the next lower container for securing the containers together, said latch being pivoted to said skirt for movement towards and away from the center thereof and having an upwardly facing abutment adapted to engage beneath said keeper and cam edges leading downwardly from the abutment and adapted to engage the keeper during the operation of assembling one container upon the other and a spring normally urging said latch inwardly to latching position.

2. A food container having at its top a handle, a lug on the top of the container and extending towards one side thereof, a keeper carried by the handle and extending towards the other side of the container, said container having at its bottom a depending skirt adapted to rest upon and receive the top portion of another similar container when placed thereon, said skirt having at one side a slot adapted to receive a lug on the top of a similar container, and a latch mounted in the wall of the skirt opposite said slot and movable towards and away from the center of the container and having an abutment adapted to engage beneath the keeper on the handle of a similar container and a spring associated with the latch and normally urging the same into latching position.

HARRY M. BADGER.
OSCAR M. ANDERSON.